US 6,714,215 B1

(12) United States Patent
Flora et al.

(10) Patent No.: US 6,714,215 B1
(45) Date of Patent: Mar. 30, 2004

(54) SYSTEM AND METHOD FOR DISPLAYING MEDIA INTERACTIVELY ON A VIDEO DISPLAY DEVICE

(75) Inventors: William T. Flora, Seattle, WA (US); Robert Edward Parkin, Redmond, WA (US); Christopher R. Fox, Seattle, WA (US); Gregory R. Slayden, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/574,375

(22) Filed: May 19, 2000

(51) Int. Cl.[7] .................................................. G06F 3/14
(52) U.S. Cl. ....................... 345/716; 345/859; 345/862; 345/838; 715/501.1
(58) Field of Search ................................. 345/856, 854, 345/716–718, 859–862, 835, 839, 838, 711, 764, 968, 808, 809, 730; 715/501.1, 500.1; 340/990, 995; 707/104.1

(56) References Cited

U.S. PATENT DOCUMENTS

| 5,708,845 | A | * | 1/1998 | Wistendahl et al. ..... 715/500.1 |
| 6,175,840 | B1 | * | 1/2001 | Chen et al. .............. 715/501.1 |
| 6,229,524 | B1 | * | 5/2001 | Chernock et al. ....... 345/719 X |
| 6,229,541 | B1 | * | 5/2001 | Kamen et al. .............. 345/719 |
| 6,362,840 | B1 | * | 3/2002 | Burg et al. ................. 345/835 |
| 2001/0033296 | A1 | * | 10/2001 | Fullerton et al. ........... 345/730 |

OTHER PUBLICATIONS

*PC Globe* version 5.0 User's Guide, PC Globe, Inc., pp. 1–2, 4, 10–11, 22–23, 1992.*

* cited by examiner

*Primary Examiner*—Raymond J. Bayerl
(74) *Attorney, Agent, or Firm*—King & Spalding LLP

(57) ABSTRACT

A graphical user interface (GUI) allows a user to directly access items of visual and/or audio media by passing a cursor over points on an electronic map. Indicators in the form of icons representing media items can be displayed and can be accessed through a media viewer. A determination is made whether a position indicator or pointer, such as a cursor, is located proximate to a GUI location that is associated with supplemental content in the form of a media item. If so, an indicator is presented to advise the user that supplemental content is indeed associated with that location on the interface. For example, a media icon representing one or more media items can be displayed on the output device proximate to the location of the input device indicator. This indicator serves as a prompt or cue for the user to select the indicator if the user desires to review the supplemental content. A determination is made whether the media icon has been selected in response to an input signal issued by an input device. If so, the selected media item, typically video and/or audio information, is presented to the user via the output device.

19 Claims, 6 Drawing Sheets

SYSTEM AND METHOD FOR DISPLAYING MEDIA INTERACTIVELY ON A VIDEO DISPLAY DEVICE

TECHNICAL FIELD

The present invention relates to interactive electronic maps. More specifically, the invention relates to an interactive map that allows users to display different items of visual and/or audio media corresponding to a location on the geographic map.

BACKGROUND OF THE INVENTION

As computer technology has advanced, atlases have been published in electronic form. These electronic atlases make it possible to include vast amounts of information on a few compact discs (or CD-ROMs). This information includes electronic maps and items of visual and/or audio media. Although the advent of electronic atlases has made such media more accessible and the relationship between electronic maps and such media more direct and interconnected, the prior art did not provide users with an efficient mechanism for easily locating and associating such media with electronic maps.

To allow users to more easily associate such media with electronic maps, one prior art electronic atlas provided a limited level of association between visual and/or audio media and electronic maps. For example, prior art atlases have displayed representations of certain types of visual media directly on the face of an electronic map. This allowed a user to view the media on a pre-determined location upon the face of the map. Although this atlas was useful, the media content and map were not interactive and supported the use of limited quantity, variety and types of media.

In another prior art atlas, media icons were displayed upon the face of an electronic map when the user passed a input device position indicator, such as a cursor, over locations on the map with which a media item or items had been associated or linked. The user could then access a full-size or complete version of the media item by selecting the location, typically by using an input device to issuing an input signal, and opening a separate window, such as a dialog box. Selecting the item via the dialog box presented to the user accesses the desired media item. Although such electronic maps were interactive, these prior maps allowed a user only to see media representations from an exact location, e.g., within a few pixels of the cursor, at the same time. Moreover, the prior electronic maps only allowed the user to access the full-size or complete media item indirectly by selecting the media item from within a dialog box or other tabular form. In addition, such electronic maps did not provide the user with any ability to filter or restrict the type of visual and/or audio media that the user could locate by interacting with the electronic map.

Consequently, there is a need in the art for an electronic atlas that provides a direct interface to visual and/or audio media through an interactive electronic map. Moreover, there is a need for an electronic map that provides a user with direct access to large amounts of media at the same (or a very short) time period and over a larger area of an electronic map. As a result of such increased access to media, there is a corresponding need for the ability to filter or restrict the type of media that a user can locate by interacting with an electronic map. Also, as a result of such increased media access, there is a corresponding need for retrieving and displaying such media in an efficient manner.

SUMMARY OF THE INVENTION

The present invention solves the aforementioned problems existing in the prior art by providing an interactive interface between a user and graphical user interface for presenting electronic content, such as a geographical map. For example, the present invention can support the presentation of a scalable interactive geographic map having selectable content associated with map locations. The map can be scaled from a global view down to view of individual cities and towns. At any point along this scale, the user can interact with the map and be presented with media associated with locations on the map. The present invention can be utilized with a variety of graphical content presented in an electronic format, including road maps, photographs, or other types of graphical user interfaces.

The present invention supports the presentation of media items interactively via an output device, such as a video display device for a computer. The present invention allows a user to interact with a geographic map to facilitate access to content associated with locations of the electronic map, including items of visual and/or audio media. For example, a user can use an input device, such as a mouse, to pass a position indicator presented in the conventional form of a cursor over an electronic geographic map. In the alternative, the user can use one or more keyboard commands to move the position indicator to a selected location on the electronic map. If the cursor passes within a pre-selected distance of a predetermined point on the map that is associated with at least one media item, the user can be presented each media icon representing available media items at that location. The user can then pass the cursor over a displayed media icon and directly access the media item by selecting the media icon with a "click" of a mouse button. In this manner, the user can access an expanded version of a selected visual media item, play and replay a selected audio media item, and select hyperlinks associated with related content.

A user can interact directly with the geographic map to access media items, such as graphic and text-based visual media and audio media without the necessity to access the media through the indirect use of a dialog box or other device. This interaction allows a user to select a location on the geographic map and to be presented with media items that are associated with the specific, chosen location and those items associated with locations within a predetermined distance thereof. Further, the present invention allows a user to customize the interactive nature of the invention by filtering and/or restricting the type and categories of media with which the user will be presented during their interaction with the map. Due to limits in computing power of machines used by particular users, the present invention can present media in an efficient manner that provides a user with the perception that the invention is responding quickly to the user's inputs. For example, the amount of media available for presentation at a chosen location on the map can be restricted when a user's computer has a slower processing speed. This restriction is performed in a manner that is not perceived by the user and, ultimately, provides the user with the perception that the invention is responding quickly to the user's inputs.

DETAILED DESCRIPTION OF THE EXEMPLARY EMBODIMENTS

Figure 1:
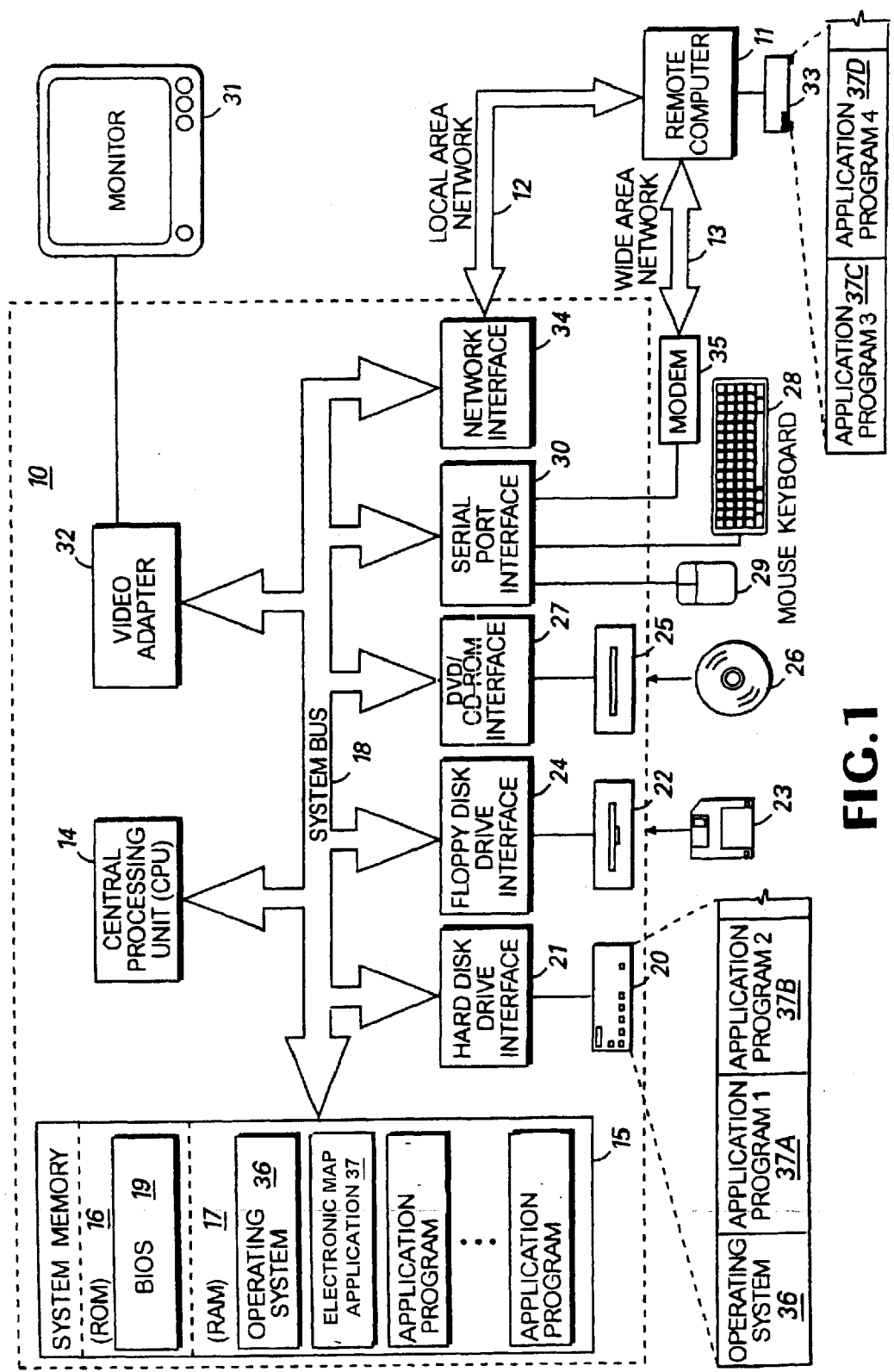
FIG. 1 is a block diagram of a personal computer that provides an exemplary operating environment for the present invention.

The present invention supports the presentation of media items interactively via an output device, such as a video display device for a computer. The present invention allows a user to interact with a graphical user interface ("GUI"), such as a geographic map, to facilitate access to content associated with locations of the electronic map, including items of visual and/or audio media. For example, a user can use an input device, such as a mouse, to pass a position indicator presented in the conventional form of a cursor over an electronic geographic map. In the alternative, the user can use one or more keyboard commands to move the position indicator to a selected location on the electronic map. If the cursor passes within a pre-selected distance of a predetermined point on the map that is associated with at least one media item, the user can be presented each media icon representing available media items at that location. The user can then pass the cursor over a displayed media icon and directly access the media item by selecting the media icon with a "click" of a mouse button. In one exemplary embodiment, the media items are presented through the use of a window frame on a video display device in the form of a media viewer. Using the media viewer, the user can access an expanded version of a selected visual media item, play and replay a selected audio media item, and select hyperlinks associated with related content.

The present invention also can support the creation of a perception by the user that a processor operating at a relatively slow processing speed is fully responsive to commands to present desired electronic content. For one exemplary embodiment, a threshold boundary is positioned proximate to and surrounds each electronic map location. In the event that the cursor crosses this threshold boundary, an icon representing content for a media item is presented to the user. The distance separating the threshold boundary from the electronic map location can be reduced when a determination is made that the computer operates at a relatively slow processing speed. This reduction is the threshold distance to the electronic map location supports the presentation of an icon representing a media item only when the cursor is placed on or adjacent to that location. In addition, two sets of software instructions can operate through multi-tasking to structure the identification and retrieval of media items. This multi-tasking thread architecture can create the perception by a user that media items are available shortly after the user places the cursor proximate to an electronic map location having associated media items.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks and the global Internet.

In addition, it should be understood that the programs, processes, methods, etc., described herein are not related or limited to any particular computer or apparatus, nor are they related or limited to any particular communication network architecture. Rather, various types of general-purpose machines may be used with program modules constructed in accordance with the teachings described herein. Similarly, it may prove advantageous to construct a specialized apparatus to perform the computer-supported processes described herein by way of dedicated computer systems in a specific network architecture with hardwired logic or programs stored in nonvolatile memory, such as read-only memory.

Referring now to the drawings, in which like numerals represent like elements throughout the several figures, aspects of the present invention and the preferred operating environment will be described. FIG. 1 illustrates various aspects of the preferred computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications. FIG. 1 illustrates a conventional personal computer 10 suitable for supporting the operation of an exemplary embodiment of the present invention. As shown in FIG. 1, the personal computer 10 operates in a networked environment with logical connections to a remote computer 11. The logical connections between the personal computer 10 and the remote computer 11 are represented by a local area network (LAN) 12 and a wide area network (WAN) 13. In this client/server configuration, the remote computer 11 may function as a file server or computer server.

The personal computer 10 includes a central processing unit (CPU) 14, such as "PENTIUM" microprocessor manufactured by Intel Corporation of Santa Clara, Calif. The personal computer also includes system memory 15 (including read-only memory (ROM) 16 and random access memory (RAM) 17), which is connected to the CPU 14 by a system bus 18. The preferred computer 10 utilizes a BIOS 19, which is stored in ROM 16. Those skilled in the art will recognize that the BIOS 19 are a set of basic routines that helps to transfer information between elements within the personal computer 10. Those skilled in the art will also appreciate that the present invention may be implemented on computers having other architectures, such as computers that do not use a BIOS, and those that utilize other types of microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A DVD/CD-ROM drive 25, which is used to read a DVD or CD-ROM disk 26, is connected to the system bus 18 via a DVD/CD-ROM interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, DVD/CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the global Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36 and application programs, such as an interactive electronic map application 37, are provided to the personal computer 10 via computer-readable media. In the preferred computer, the computer-readable media include the local or remote memory storage devices, which may include the local hard disk drive 20, floppy disk 23, DVD/CD-ROM 26, RAM 17, ROM 16, and the remote memory storage device 33. In the preferred personal computer 10, the local hard disk drive 20 is used to store data and programs, including the interactive electronic map 37. During user operation of the preferred computer 10, data and programs can be retrieved from the local hard disk drive 20 and are stored in local memory, such as RAM 17.

Figure 2:
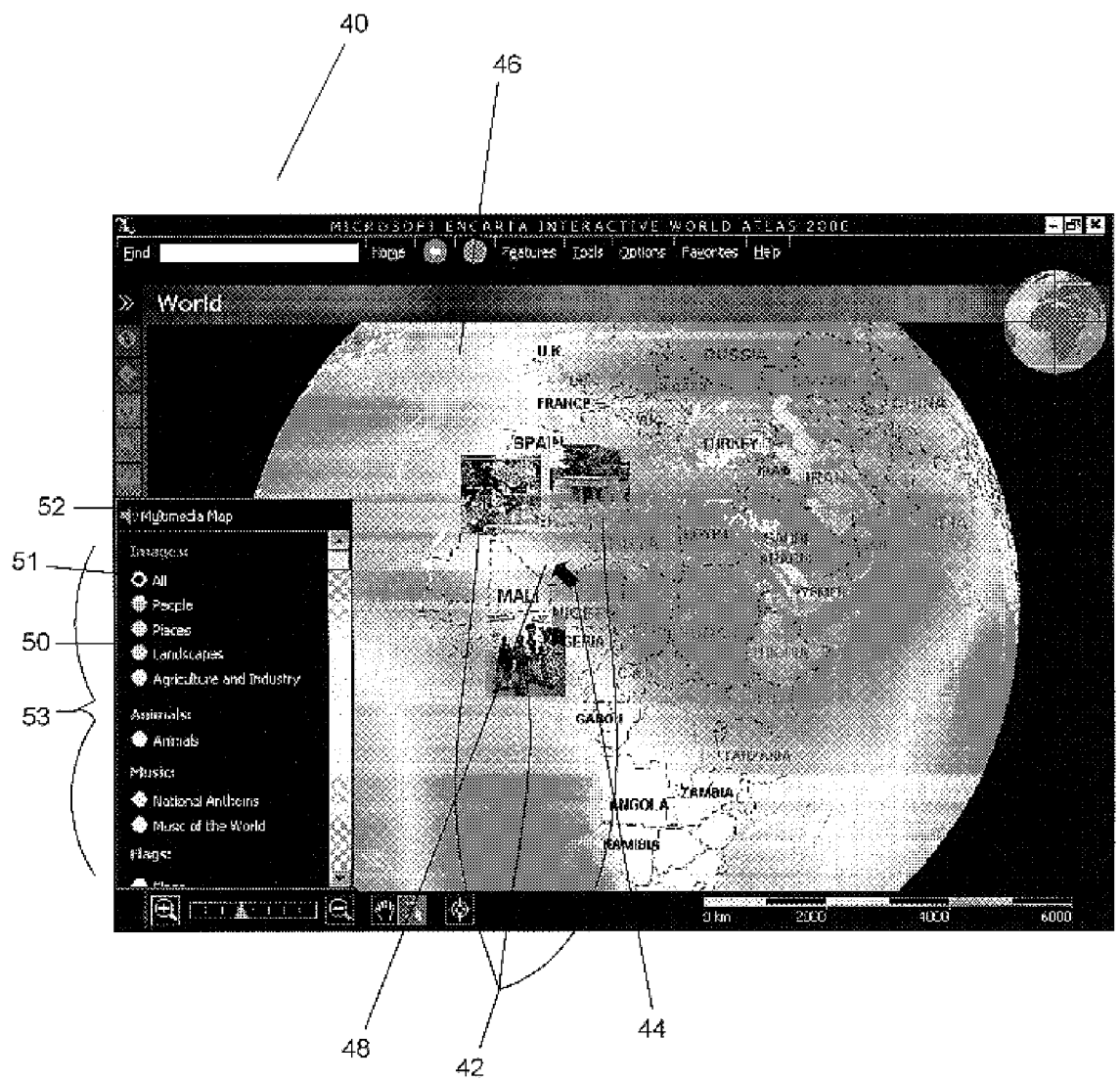
FIG. 2 is an exemplary display screen of a software program that illustrates the display of a media icon in response to a selection of a location on an electronic geographic map.

Turning now to FIGS. 2–5B, an exemplary embodiment of the present invention is described via the conventional software illustration tools of representative display screens and logical flow chart diagrams. FIG. 2 is a display screen showing the graphical user interface (GUI) component 40 of an exemplary embodiment of the present invention. Although this embodiment utilizes a scalable geographic map, those skilled in the art will recognize that the present invention can be utilized with other electronic forms of graphical content, such as road maps, animation, photographs, etc. In this embodiment, media items, typically represented by icons 42 (or "thumbnail" versions), are displayed when a position indicator, shown as cursor 44, is moved proximate to certain locations on an electronic geographic map 46. These icons 42 notify the user that media items are associated with predetermined coordinates or "locations" on the map that are proximate to the position of the cursor 44. The icons 42 further provide the user with a visual object to select with the "click" of a mouse button (or another conventional mechanism) to obtain direct access to the content of the associated media items. All map locations are not necessarily associated with media items. For example, if the user moves the cursor 44 to a new location on the electronic map, the icons 42 displayed proximate to the old location will eventually disappear or fade after a pre-determined period of time. If content is associated with the new location, however, new icons will appear proximate to the new cursor position.

The exemplary geographic map 46 of the globe is scalable and can show fine levels of geography, such as individual cities and towns. The user may interact with a displayed icons 42 to gain access to further information regarding the subject of the displayed icon. For example, the user can quickly see what media items, if any, are available at a chosen location by moving the cursor over an area of the map 46 proximate to that location. For visual media, the user is presented with icons 42 or "thumbnail" versions of the available media items associated with one or more locations proximate to the position of the cursor 44. In addition, as the geographic map is scaled upwards or downwards, the number of locations (that are associated with media items) are reduced or increased respectively. Thus, the user will be presented with a larger number of media items when the map 46 is scaled to show finer detail and will be presented with a smaller number of media items when the map 46 is scaled to show a lower level of detail. This prevents the map 46 from becoming visually cluttered or crowded and thereby confusing the user during interaction with the map 46.

The exemplary embodiment of FIG. 2 can allow a user to restrict the media to be presented to different types and categories of media through the use of a media menu 50 with the listed media categories 53. Representative media categories include images relating to people, places, landscapes, agriculture and industry and animals; audio media relating to national anthems and music of the world; and visual media representing national flags. It will be appreciated that the present invention can be extended to include any and all types of visual and/or audio media. To exercise this option, the user chooses the desired media category or categories by using an input device, such as a mouse, to select an icon 52 and thereby open the media menu 50. Thereafter, the user may use an input device to choose the particular category or categories of media to be retrieved when interacting with the geographic map 46.

In FIG. 2, a user has restricted the categories of media to "images" by selecting this category on the media menu 50. The user has also used an input device, such as a mouse, to find locations associated with images by placing the cursor 44 over a position on the geographic map 40. In response to the user input, media icons 42 representing all images associated with locations proximate to the cursor are displayed to the user.

Figure 3:
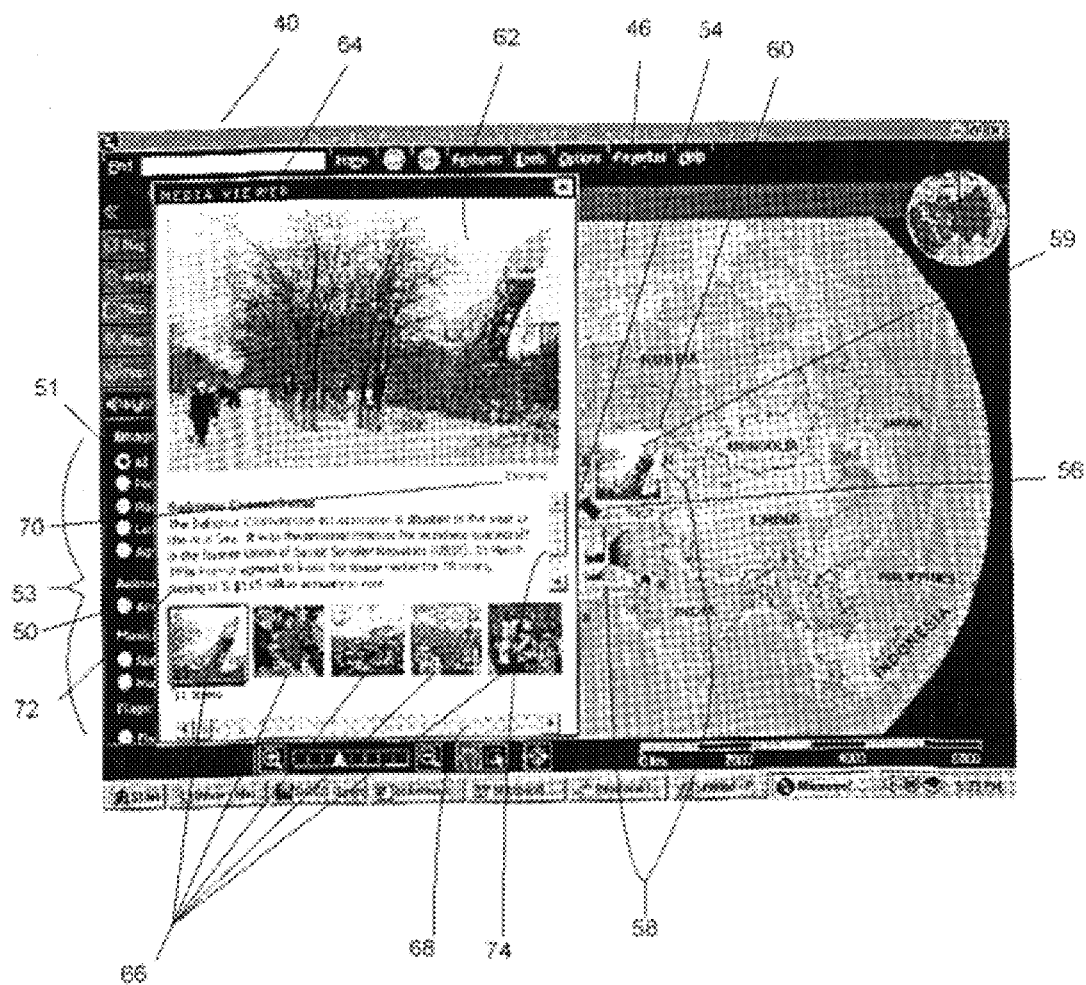
FIG. 3 is an exemplary display screen of a software program that illustrates the display of a full-size image of an item of visual media in direct response to a user clicking on a visual media icon on an electronic geographic map.

FIG. 3 is a display screen showing the GUI 40 of an alternative exemplary embodiment of the present invention.

In this view, a user has restricted the type of media to be presented to all "images" by selecting that category from the media categories 53 listed on the media menu 50. The user has also passed the cursor 56 over the map to a position that is proximate to locations associated with images. In response to this user input, the user is presented with icons 58 representing images (the restricted media category) associated with the locations proximate to the cursor 56.

In the exemplary embodiment shown in FIG. 3, there are multiple visual media items associated with the locations proximate to the cursor 56 that have associated media items. Only a single icon 59 can be presented for each specific location in a reduced-pixel or "thumbnail" format due to the limited size of the geographic map 46. In order for the user to be presented with all icons for available media, icons representing the pertinent media items at the same location on the geographic map are consecutively displayed to the user. This process of scrolling among the available icons at an electronic map location is referred to as "cycling." Thus, an icon representing each additional media item that is available for the locations proximate to the cursor 56 will cycle in the same icon window 60 as the initially displayed icon 59.

As shown in FIG. 3, the user has moved the cursor 56 so as to contact one of the presented icons 59. The user has further selected the icon 59 by way of user input, such as a mouse click, so as to be given direct access to a full-size display of one of the media items 62 represented by the icon 59. To provide such access, an additional window (or media viewer) 64 is opened and displays the full-size image of the media item 62 therein. In this embodiment, the location associated with the media item 62 is also associated with additional media items. Upon selection of the icon 59, one of the media items 62 represented by the icon is arbitrarily selected and displayed in the media viewer 64. Also, the user can access all other media items associated with the map location and that are cycled in the icon window 60 by selecting among the icons 66 associated with those other media items from a scrolling list 68 of icons 66 within the media viewer 64. In order to access the additional media items, the user can contact the desired media item's icon 66 with the cursor 56 and select the media item through a mouse click.

Through the media viewer 64, the user is able to execute a hyperlink 70 and display an expanded version of the visual media item. For example, the user can jump to a expanded version of a visual media item that could include such things as explanatory text, related text articles or further hyperlinks to related information. As shown in FIG. 3, where the caption 72 of the chosen media item is lengthy, the media viewer 64 allows for a scrolling list 74 so that the user can view the entire description. In addition, the caption 72 of the chosen media item may contain additional hyperlinks.

As can be seen in FIG. 2, the present invention can be configured so as to present a user with various types of media 53 for a selected graphical content, such as an electronic map. These media types typically include photographic or animated visual media, textual media, audio media and computer-generated graphic visual media. In the case of audio media, the user can be presented with such media through the use of icons, which allow a user to direct access the content of the audio media through a audio playback device contained within the media viewer 64. In the case of other types of audio media, a user also can be presented in either icon or thumbnail versions and accessed through the media viewer 64.

Figure 4:
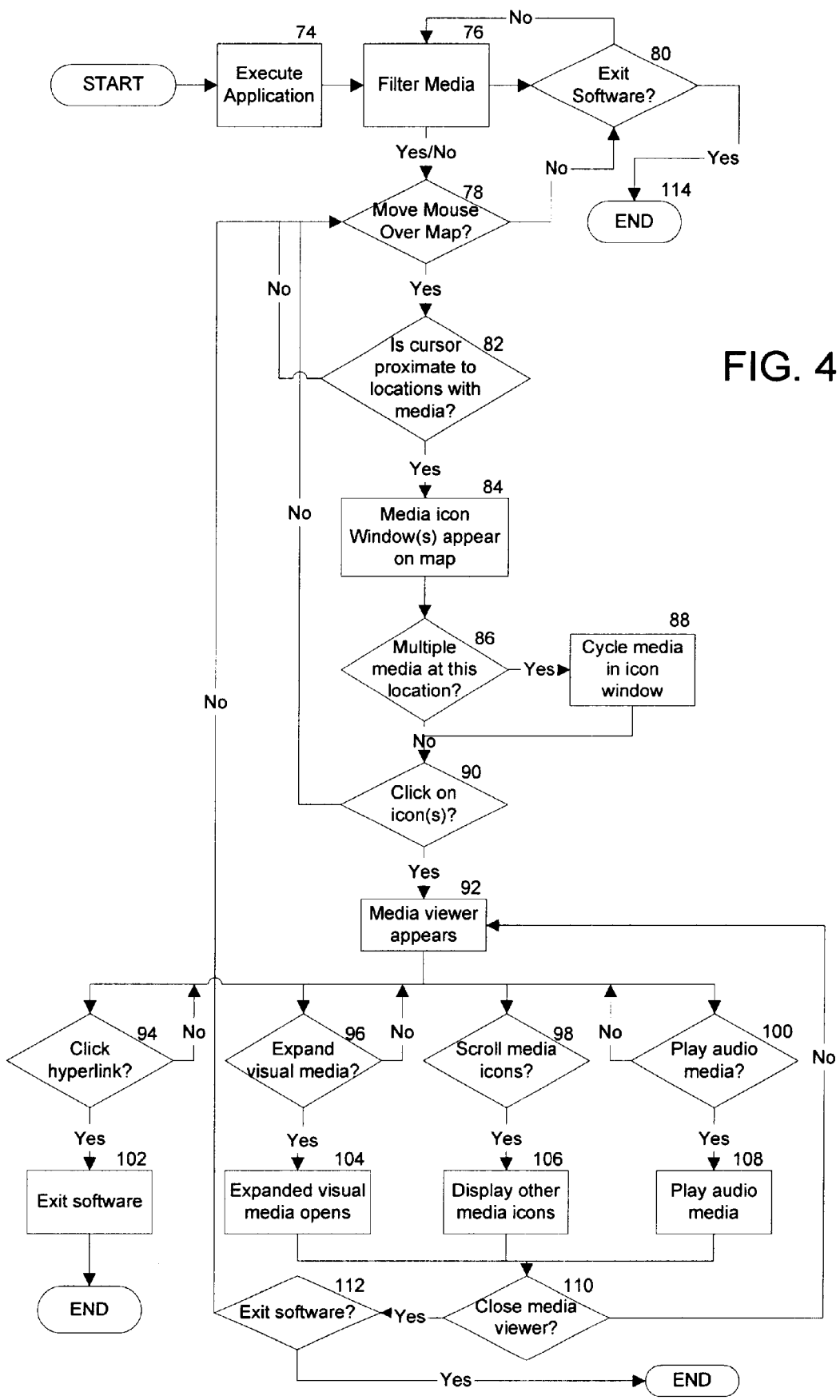
FIG. 4 is a logic flow diagram illustrating an exemplary process for displaying media items interactively upon a video display device.

Turning now to FIG. 4, an exemplary embodiment of the present invention is shown in the form of a logic flow diagram. In this embodiment, the user selects the electronic map program for operation. The user may then select whether or not to filter retrievable media items in step 76. The user then chooses whether to move a position indicator or pointer, such as a cursor, over the electronic map by use of an input device in step 78. A determination is made as to whether the cursor has been moved proximate to locations on the map that are associated with media items in step 82. If the cursor is moved to a point that is associated with media, media icon windows appear on the map in step 84. If no media items are associated with the cursor location, the user can continue moving the cursor until it contacts such a location in step 78. In step 86, a determination is made as to whether there are multiple media items associated with the locations proximate to the cursor. If so, the icons of the various media items are cycled in step 88. After the icons have been displayed and/or cycled, the user may choose to click on a displayed icon 90. Otherwise, the user may continue to move the cursor across the electronic map in step 82 or elect to exit the computer-implemented process in step 114.

If the user selects a displayed icon in step 90, the media viewer 92 is opened and presented to the user. The user then has several options from within the media viewer 92. The user can elect to review any additional media associated with the directly accessed media by executing available hyperlinks in step 94 and thereafter exits the process in step 102. The user also can elect to display an expanded version of the media item, if one is available, in steps 96 and 104. The user can elect to scroll the other media items contained within the media viewer in step 98 and to display such media items within the media viewer in step 106. The user can elect to play audio media in steps 100 and 108. After each of these choices, the user can close the media viewer 92 in step 110 or return to one of the media viewer options from step 92. If the user closes the media viewer in step 110, the user can either exit the process in step 112 or return to move the mouse over the map to a new location in step 78.

Another exemplary embodiment comprises two computer-implemented tasks or sequences that operate simultaneously (through multi-tasking) to identify and retrieve media items for viewing and/or access by a user interacting with an electronic map. The first sequence, which relates to the "interface" or the interactive point-and-click activity by the user, is referred to as the "interface thread." The second sequence, which relates to the actual retrieval of media items for viewing and/or access by the user, is referred to as the "retrieval thread."

The interface thread acts to identify locations over which the user has passed his cursor for which media items are available. The interface thread then passes this information to the retrieval thread. The retrieval thread acts to retrieve the available (and pre-selected) media items for viewing and/or access by the user. By allowing these threads to operate simultaneously, the invention allows the user to move quickly from point to point on the geographic map and to quickly identify the media items available at each point.

This exemplary embodiment further acts to provide the perception to the user that media items are available quickly from multiple locations on the geographic map and that media items are available quickly from the scrolling icon list 68 of the media viewer 64. This perception is provided through the order of execution of the processing steps associated with the retrieval thread. Specifically, the retrieval thread acts to retrieve media items by dividing media locations identified by the interface thread into four categories:

(1) locations for which no media items have been "fetched" into memory;
(2) locations for which one or more media items have been "fetched" into memory;
(3) locations for which all available media has been fetched into memory; and
(4) locations within the media viewer.

The retrieval thread normally assigns first priority to category 1 locations for the purpose of media item retrieval and second priority to category 2 locations. Specifically, the retrieval thread will fetch at least one media item into memory for all locations in category 1 before it fetches additional items into memory for category 2 locations. Once all category 1 locations have at least one media item retrieved (i.e., all category 1 locations have been converted into category 2 locations) the retrieval thread will load one additional remaining media item, if any, for each category 2 location. The retrieval thread then reassesses all media locations. After all media items have been fetched into memory for all category 2 locations (i.e., all category 2 locations have been converted into category 3 locations), the retrieval thread will pause for a pre-selected time period to allow more processing time for the interface thread. This process will then start again after the pre-selected time period has expired.

In addition to locations on the geographic map, the retrieval thread also interacts with the media viewer 64 to provide the perception to the user that additional media items 66 are available quickly from the scrolling icons list 68 of the media viewer 64. If a user selects a media icon 59 and thereby opens the media viewer 64, the retrieval thread will assign first priority to category 4 locations, i.e., those media locations on the scrolling icon list 68.

An exemplary embodiment also supports varying configurations of the interface thread to provide the perception of greater responsiveness and speed to users that utilize computer systems with slower processing speeds. Specifically, the interface thread identifies locations with which media items are associated. In one exemplary embodiment, the locations are defined by a rectangular area of a pre-set number of pixels centered at the position of the cursor. If the interface thread determines that a particular central processing unit has a relatively fast or slow processing speed, the system will increase or decrease the size of the pixel area associated with the available locations on the geographic map and identified by the interface thread. For example, the processing steps associated with the interface thread can reduce the size of the rectangular pixel area centered on the cursor. Thus, the interface thread will order the retrieval thread to fetch fewer media items with respect to a given cursor location, providing the user with the perception that the system is faster and more responsive.

Figure 5A:
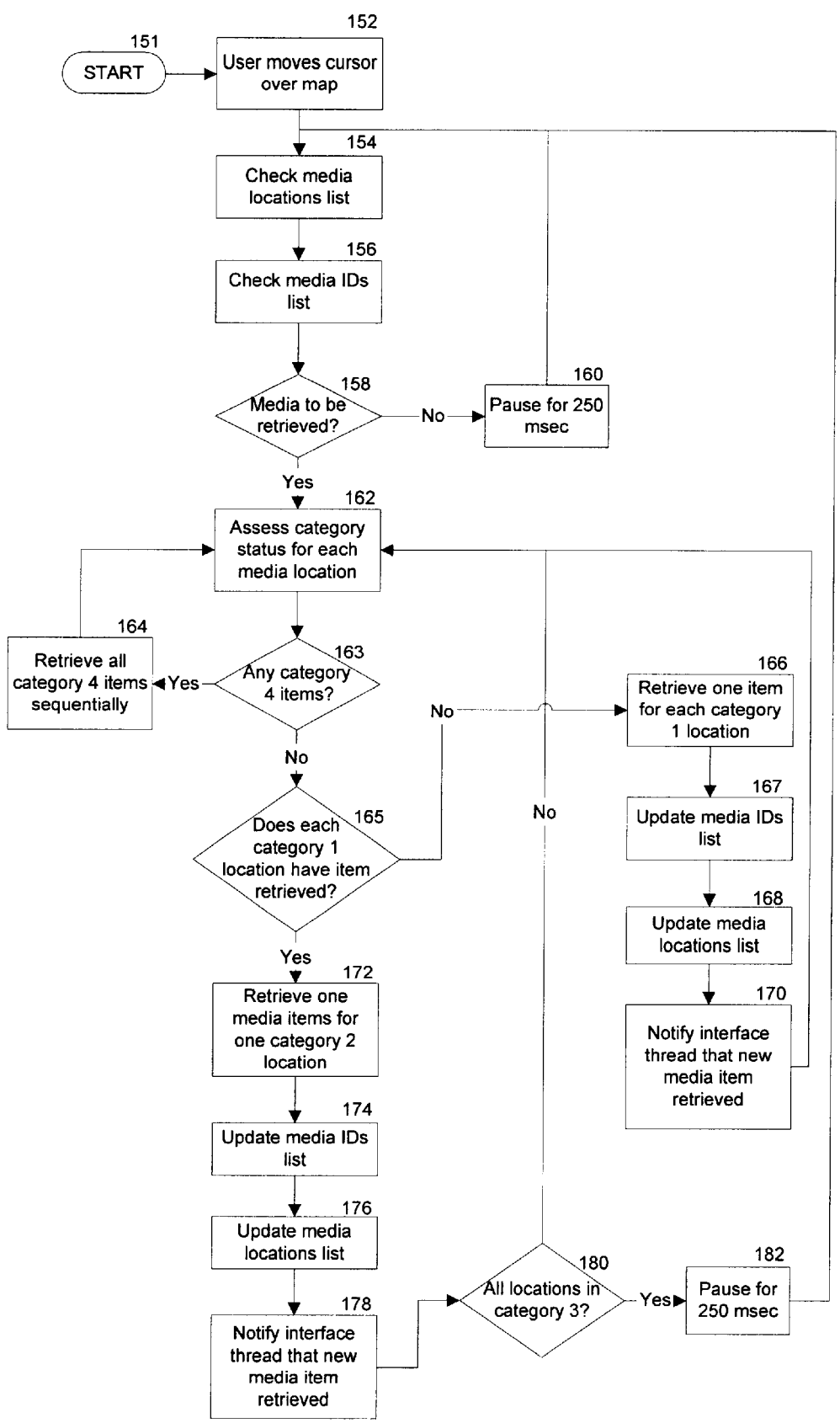
FIG. 5A is a logic flow diagram illustrating an exemplary process for identifying and retrieving media items into a computer for the purpose of displaying such items on a video display device.
Figure 5B:
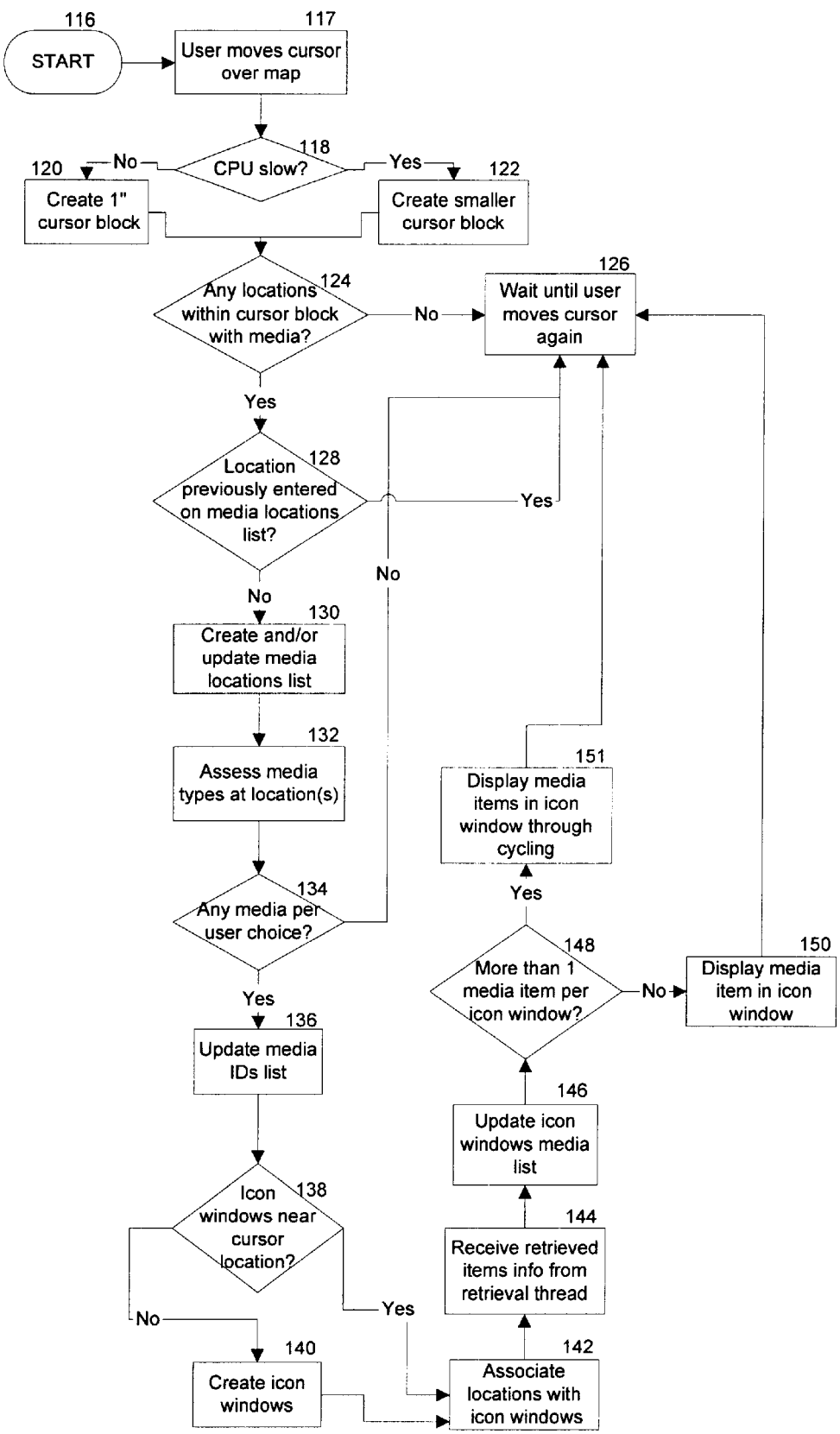
FIG. 5B is a logic flow diagram illustrating an exemplary process for identifying and retrieving media items into a computer for the purpose of displaying such items on a video display device.

Turning now to FIGS. 5A and 5B, logic flow diagrams are used to illustrate the exemplary operations of the interface and retrieval threads 116 and 114. The interface thread 116 is started when a user moves the cursor over the electronic map in step 117. The interface thread 116 first determines whether the user's CPU has a relatively slow processing speed in step 118. Then the interface thread 116 either creates a one inch (1") square rectangle or cursor block to be centered around the cursor in step 120 or it creates a smaller cursor block in step 122.

Next, the interface thread 116 determines whether there are any map locations contained within the cursor block surrounding the cursor's current position that are associated with media items in step 124. If not, the interface thread 116 waits until the cursor is moved to a new location in step 126. If the cursor is so moved, the interface thread 116 restarts at step 117. If, in step 124, the interface thread 116 detects locations with associated media items, the interface thread 116 then verifies whether it has previously checked to see which specific media items are associated with such locations in step 128. The interface thread 116 then creates and/or continually updates a list of map locations that have been previously checked for media items and for which the associated media items have been identified in step 130. In step 132, the interface thread 116 analyzes the media items associated with the map locations within the cursor block. In step 134, the interface thread 116 determines whether any of the pertinent media types fit within the user-selected media categories. If the interface thread 116 determines that there are no such media, it returns to step 126 and waits for the user to move the cursor to a new location. If the interface thread 116 does detect such media in step 134, it creates a list of media identifiers that are associated with each of the locations contained within the locations list in step 136.

Following step 136, the interface thread 116 then determines whether there is an available icon window proximate to the current location of the cursor in which to display a representation of the media item(s) in step 138. If there is no such an icon window, the interface thread 116 then creates an icon window (or windows) in step 140. If there is an available icon window (or if one has been created), the interface thread 116 associates the pertinent map locations with the nearest available icon window(s) in step 142. In step 144, the interface thread 116 accepts input from the retrieval thread 114 as to which media items have been retrieved into memory. In step 146, the interface thread 116 updates the icon windows media list to reflect the presence of the newly retrieved media items. The interface thread 116 then determines more than one media item has been retrieved via a relevant icon window in step 148. If not, the single media item is displayed in the pertinent icon window in step 150. If so, the multiple media items are cycled in the pertinent icon window in step 151. At this point, the interface thread 116 returns to step 126 until the user moves the cursor to a new location.

Simultaneously with the execution of the interface thread 116, the retrieval thread 114 begins retrieval operations. In step 152, the retrieval thread 114 begins when the user moves the cursor to a new location on the map. The retrieval thread 114 then checks the media locations list in step 154 and the media identifiers list in step 156 in order to determine whether there are any media items that need to be "fetched" into memory from data storage in step 158. If no media needs to be retrieved, the retrieval thread pauses for a pre-selected period of time, such as 250 milliseconds, in step 160 before returning to step 154. If such media items do need to be retrieved, the retrieval thread 114, in step 162, reviews the category status of each map location that has been added to the map locations list by the interface thread 116. In step 163, the retrieval thread 114 determines whether any category 4 locations are present. If so, the retrieval thread 114 sequentially retrieves each media item for each location in category 4 in step 164. If not, the retrieval thread 114, in step 165, determines whether each location in category 1 has a retrieved media item. If not, in step 166, the retrieval thread 114 retrieves one media item for each location in category 1. In step 167, the retrieval thread 114 updates the list of retrieved media items for later use by the interface thread 116. In step 168, the retrieval thread 114 updates the list of map locations as to whether associated media items have been retrieved.

In step 170, the retrieval thread 114 notifies the interface thread 116 as to which media items have been retrieved into memory. The retrieval thread 114 then returns to step 162 and reassesses the category status of the identified media locations. Alternatively, if the retrieval thread 114 determines in step 165 that each category 1 location has had one media item retrieved, it retrieves one additional media item for one category 2 location in step 172. In steps 174, 176 and 178, the retrieval thread 114 updates the media location list and the media identifier list and notifies the interface thread 116 of this new information. In step 180, the retrieval thread 114 determines whether there are any remaining category 2 or category 4 locations. If so, the retrieval thread returns to step 162. If not, the retrieval thread 114, in step 182, pauses for 250 milliseconds and then returns to step 154.

In view of the foregoing, it will be understood that the present invention is directed to a computer-implemented method for interactively presenting media items associated with an electronic content presentation, such as a graphical user interface (GUI), via an output device. A determination is made whether a position indicator or pointer, such as a cursor, is located proximate to a GUI location that is associated with supplemental content in the form of a media item. If so, an indicator is presented to advise the user that supplemental content is indeed associated with that location on the interface. For example, a media icon representing one or more media items can be displayed on the output device proximate to the location of the input device indicator. This indicator serves as a prompt or cue for the user to select the indicator if the user desires to review the supplemental content. A determination is made whether the media icon has been selected in response to an input signal issued by an input device. If so, the selected media item, typically video and/or audio information, is presented to the user via the output device.

The present invention has been described above in relation to particular embodiments that are intended to be illustrative rather than restrictive. The particular embodiments described involve the use of a geographic electronic map. However, those skilled in the art will understand that the principles of the present invention apply to any task or process that requires interactivity between with an electronic content display and content items associated with locations for that content display. Alternative embodiments will become apparent to those skilled in the art to whom the present invention without departing from its spirit and scope. Accordingly, the appended claims rather than the foregoing description define the scope of the present invention.

What is claimed is:

1. A method for interactively presenting one or more media items providing supplemental content for a graphical user interface (GUI) that supports the presentation of primary content via an output device, comprising the steps of:
   determining whether a position indicator is located proximate to a location on the GUI, the location associated with one of the media items;
   if the position indicator is located proximate to the location associated with one of the media items, then displaying an indicator representing the media item associated with the location of the position indicator by cycling through a visual presentation of the indicator, the indicator providing an indication that supplemental content supported by the media item is available for presentation in connection with the location;
   determining whether the indicator has been selected in response to receipt of an input signal issued by an input device; and
   if the indicator has been selected, then presenting the supplemental content for the media item corresponding to the selected indicator via the output device.

2. The method of claim 1 wherein the step of determining whether a position indicator is located proximate to a location on the GUI comprises identifying whether the position indicator has entered a predetermined threshold boundary positioned proximate to and sounding the location.

3. The method of claim 2, wherein the predetermined threshold boundary is defined by a rectangular area centered about the coordinates of the GUI location.

4. The method of claim 2, further comprising the steps of:
   determining the relative processing speed of a computer system for presenting the GUI; and
   adjusting the size of the predetermined threshold boundary based upon the relative processing speed of the computer system.

5. The method of claim 1 wherein the indicator representing the media item comprises a reduced-pixel display image for presentation via the output device.

6. The method of claim 1 wherein the step of presenting the media item comprises displaying a digital photographic image via a window fame rendered on the output device.

7. The method of claim 1, further comprising the steps of:
   assigning the media items to one of two categories representing types of supplemental content; and
   determining whether at least one of the categories is selected; and
   if at least one of the categories is selected, then displaying the indicator only if the indicator is associated with one of the media items in the user-selected category.

8. The method of claim 1, further comprising the step of terminating a presentation of the indicator representing the media item after the position indicator is moved away from the location and upon expiration of a predetermined time period.

9. The method of claim 1, wherein the GUI is scalable and further comprising the step of adjusting the number of locations that support the presentation of the indicator representing one of the media items based on the adjusted scale of the GUI.

10. A computer-readable medium having computer-executable instructions for performing the steps recited in claim 1.

11. A method for identifying and retrieving one or more media items for the purpose of presenting said media items upon an output device, comprising the steps of:
   displaying a GUI comprising an electronic geographic map upon the output device;
   determining whether a position indicator is located proximate to a first location on the electronic map, the location associated with at least one of the media items;
   if so, retrieving a media item associated with the first location into a memory storage device;
   determining whether the position indicator is proximate to at least one additional location on the electronic map, the location associated with one of the media items;
   if so, identifying all locations proximate to the position indicator;
   assigning each identified location to status categories consisting as follows:
     category 1: no media items associated with the location have been retrieved; and
     category 2: at least one media item associated with the location has been retrieved;
   retrieving at least one of the media items for each location in category 1;
   retrieving at least one of the media items for each location in category 2;

reassigning each identified location to the appropriate category upon retrieving each media item associated therewith; and restarting the steps of identifying and assigning locations and retrieving the media items upon determining that the position indicator is proximate a new location on the electronic map.

12. The method of claim 11, further comprising the steps of:

assigning the media items to one of two categories representing types of supplemental content;

determining whether at least one of the categories is selected; and if at least one of the categories is selected, then retrieving only those media items assigned to the user selected category.

13. A computer-readable medium having computer-executable instructions for performing the steps recited in claim 11.

14. A method for interactively presenting one or more graphical media items providing supplemental content for a graphical user interface (GUI) that supports the presentation of primary content, comprising the steps of:

determining whether a position indicator is located proximate to a location, the location associated with a plurality of the media items;

if the position indicator is located proximate to the location associated with the plurality of media items, then displaying a plurality of graphical media indicators for the plurality of media items associated with the location of the position indicator by cycling through a visual presentation of the plurality of graphical media indicators, each graphical media indicator providing an indication that supplemental content supported by each media item is available for presentation in connection with the location;

determining whether at least one of the plurality of graphical media indicators has been selected in response to receipt of an input signal; and if at least one of the plurality of graphical media indicators has been selected, then presenting the supplemental content for the media item corresponding to each selected graphical media indicator.

15. The method of claim 14, wherein the position indicator and at least one of the plurality of graphical media indicators are displayed at the same time.

16. The method of claim 14, wherein the step of determining whether a position indicator is located proximate to a location comprises identifying whether the position indicator has entered a predetermined threshold boundary positioned proximate to the surrounding location.

17. The method of claim 16, wherein a first area for the predetermined threshold boundary is greater than a second area for the location associated with the plurality of media items.

18. The method of claim 14, wherein at least one of the plurality of graphical media indicators representing the plurality of media items comprises a reduced-pixel display image for presentation via an output device.

19. The method of claim 14, further comprising the steps of:

assigning at least one of the plurality of media items to a first category and a second category representing types of supplemental content;

determining if the first category or the second category is selected; and if one of tile categories is selected, then displaying each of the plurality of graphical media indicators associated with one of the media items assigned to the selected category.

* * * * *

UNITED STATES PATENT AND TRADEMARK OFFICE
CERTIFICATE OF CORRECTION

PATENT NO. : 6,714,215 B1
DATED : March 30, 2004
INVENTOR(S) : Flora et al.

It is certified that error appears in the above-identified patent and that said Letters Patent is hereby corrected as shown below:

Column 12,
Line 5, delete "sounding" and insert -- surrounding --, therefore.
Line 20, delete "fame" and insert -- frame --.

Column 13,
Line 16, delete "user selected" and insert -- user-selected --, therefore.

Column 14,
Line 32, delete "tile" and insert -- the --.

Signed and Sealed this

Twenty-eighth Day of June, 2005

JON W. DUDAS
*Director of the United States Patent and Trademark Office*